United States Patent [19]

Cohen et al.

[11] Patent Number: 4,750,119

[45] Date of Patent: Jun. 7, 1988

[54] PURCHASING SYSTEM WITH REBATE FEATURE

[75] Inventors: Jeffery M. Cohen; Ian M. Robertson, both of Boca Raton, Fla.

[73] Assignee: Tradevest, Inc.

[21] Appl. No.: 917,894

[22] Filed: Oct. 10, 1986

[51] Int. Cl.⁴ .......................... G06F 15/21; G06F 3/02
[52] U.S. Cl. ...................................... 364/401; 364/408
[58] Field of Search ........................ 364/401, 406, 408

[56] References Cited

U.S. PATENT DOCUMENTS

| | | | |
|---|---|---|---|
| 3,634,669 | 1/1971 | Soumas | 364/401 |
| 4,594,663 | 6/1986 | Nagata | 364/406 |
| 4,642,768 | 2/1987 | Roberts | 364/401 |

FOREIGN PATENT DOCUMENTS

2728933  1/1979  Fed. Rep. of Germany ...... 364/408

Primary Examiner—Charles E. Atkinson
Assistant Examiner—Gail Hayes
Attorney, Agent, or Firm—Robert C. Kain, Jr.; Michael C. Cesarano; J. Rodman Steele, Jr.

[57] ABSTRACT

The purchasing system with a rebate feature is utilized by subscriber-purchasers, vendors providing goods and services, a future benefit guarantor such as an insurance company selling annuity contracts and in some cases an escrow agent. The purchasing system allows for the input of purchase orders from the subscriber-purchasers for selected goods and services and correlates the transfer of funds from those purchaser-subscribers to the various vendors selling the selected goods. In one instance, the transfer occurs between the subscriber-purchasers and the escrow agent. The future benefit guarantor supplies a rebate factor which is input into the system. The system then computes and reports a rebate which is due in the future to each subscriber-purchaser from the future benefit guarantor. The rebate is based upon cost of the individually selected goods and services and the rebate factor. The system provides instructions to pay the vendors for the selected goods and services and to pay the future rebate guarantor a premium representing the purchase price of the future guaranteed rebates. Preferably, the premium is paid on a daily basis to the guarantor and a group annuity contract is funded until the end of the fiscal year. At that time, the system further instructs the guarantor to issue individual future guaranteed rebate contracts to each purchaser-subscriber based upon the total rebates or total purchases over the accounting period.

6 Claims, 4 Drawing Sheets

DAILY REPORT

REPORT DATE 00/00/00

| TRANSMITTAL | ID | NAME | CODE TICKET/DETAIL | BASE COST | TAXES | ADMIN FEE | TOTAL PAID | ICA FUND |
|---|---|---|---|---|---|---|---|---|
| T104101 | 211-11-1111 | KURTZ JULIE | TOMALA/J | 83.34 | 6.66 | 6.00 | 96.00 | 89.34 |
| T104102 | 487-11-1111 | WELRON ROBERT J | WELRON/R | 184.27 | 14.73 | 6.00 | 205.00 | 190.27 |
| T104103 | 265-11-1111 | LONG MICHAEL D | LONG/M | 399.07 | 31.93 | 6.00 | 437.00 | 405.07 |
| | | | | 666.68 | 53.32 | 18.00 | 738.00 | 684.68 |

FIG. 3

VENDOR/ICA INFORMATION   REPORT DATE 00/00/00

| TRANSMITTAL | ID | NAME | CODE TICKET/DETAIL | MERCHANDISE | TAXES | VENDOR CHARGE | ADMIN FEE | TOTAL PAID | ICA FUND |
|---|---|---|---|---|---|---|---|---|---|
| KT07103 | 000-11-1111 | JAMES TOMMY H | FLOWERS | K-MART | 18.75 | 400.00 | 8.00 | 426.75 | 408.00 |
| KT07104 | 100-11-0111 | KELLY RICHARD P | FLOWERS | ABC | 1.55 | 28.00 | 3.00 | 32.55 | 31.00 |
| KT07105 | 010-11-1011 | CARTY JAMES C | FLOWERS | ABC | 2.55 | 49.00 | 2.00 | 53.55 | 51.00 |
| KT07106 | 001-11-1101 | LYNDS GLENDON M | FLOWERS | ABC | 1.55 | 28.00 | 3.00 | 32.55 | 31.00 |
| KT07107 | 000-01-1111 | MILLER WILLIAM A | FLOWERS | ABC | 1.55 | 28.00 | 3.00 | 32.55 | 31.00 |
| KT07108 | 110-11-1111 | DALMAU FRANCES | PLANT | ABC | 1.55 | 27.00 | 4.00 | 32.55 | 31.00 |
| | | | | | 27.50 | 560.00 | 23.00 | 610.50 | 583.00 |

FIG. 4

INDIVIDUAL CONSUMER ACCOUNT STATEMENT

1ST QUARTER
APRIL, MAY, JUNE, 1986
ID: 000-00-0000

JOHN DOE
101 ANY STREET
PLEASANTVILLE, USA

| DATE | DESCRIPTION | TOTAL AMOUNT | LESS TAXES | ESTIMATED REBATE FACTOR | FUTURE REBATE |
|---|---|---|---|---|---|
| 05/01/86 | PHONE | $ 106.45 | $ 101.50 | 90 % | $ 91.35 |

TOTAL QUARTERLY DEFERRED REBATE     $ 91.35
BALANCE FORWARD     $ 201.60
TOTAL DEFERRED REBATE     $ 292.95

FIG. 5

PURCHASING SYSTEM WITH REBATE FEATURE

The present application relates to a purchasing system computer program and particularly relates to a system which includes a future guaranteed rebate to the purchaser of goods and services.

Traditionally, in a retail marketing system, vendors market their goods and services utilizing various schemes, such as advertising, leaflets and such, to inform the consumer/purchaser of the availability of the goods and services and to obtain the continued patronage of the purchaser. This marketing strategy almost dictates that the advertising will continue indefinitely.

With the increased awareness of consumers of the quality and price of products, goods and services, this type of marketing strategy is expensive and does not assure that the consumer/purchaser will return to a particular vendor.

OBJECTS OF THE INVENTION

It is an object of the present invention to provide a computer program, utilized in combination with a purchasing or transactional system, which allows subscriber-purchasers to buy goods and services and obtain future guaranteed rebates based upon the cost of that purchase.

It is another object of the present invention to provide an orderly control of funds between a purchaser-subscriber, a plurality of vendors and a future benefit guarantor using a data processing program on a computer.

It is an additional object of the present invention to produce reports showing the subscriber-purchaser his future rebates in order to motivate the purchaser to patronize vendors who are associated with the purchasing system.

SUMMARY OF THE INVENTION

In one embodiment, the system for purchasing goods and services is combined with a transactional system utilized by a plurality of subscriber-purchasers, a plurality of vendors and a future benefit guarantor. The future benefit guarantor provides a rebate factor which is periodically calculated. The guarantor, in one working embodiment, is an insurance company and the rebate is an annuity contract due 20 years from the end of a fiscal accounting year. The purchasing system includes means for inputting purchase orders from a plurality of subscriber-purchasers for selected goods and services available from the vendors. These orders are input over a short period of time, for example, on a daily basis. Means is provided for correlating the transfer of funds with the orders, the funds coming from the subscriber-purchasers for the cost of the selected goods and services. In one embodiment, the transfer occurs between the subscriber-purchasers and an escrow agent and in another embodiment a simple correlation between the purchase orders and the receipt of funds is made.

The rebate factor supplied by the future benefit guarantor, the insurance company, is input into the system. An estimate of the future rebate is computed based upon the cost of the individually selected goods and services and an estimated rebate factor as input into the program. This computation is reported to the individual subscriber-purchaser in order to motivate that subscriber-purchaser to continue to patronize the vendors utilizing this transactional system.

In one embodiment, the purchasing system or the computer program generates instructions to pay the vendors for the plurality of selected goods and services and pay the future rebate guarantor, the insurance company, a premium representing the purchase price of all the future guaranteed rebates that the insurance company will be required to make to the plurality of purchaser-subscribers on the predetermined future date. The predetermined future date is the day 20 years from the end of the fiscal year.

Throughout the fiscal year, i.e., the accounting period, the paid-in premium purchases a group annuity policy and at the end of the fiscal year, the insurance company is instructed via the inventive purchasing system to issue individual future guaranteed annuity contracts to each purchaser-subscriber based upon the purchaser's total rebate accumulated over the fiscal year. Therefore, the total rebates over the fiscal year are accumulated and instructions are issued to the insurance company by this computer program system.

In another embodiment, the vendors are paid directly with the assistance of the computer program. As a further alternative, the subscriber-purchasers are provided only an estimated rebate during the fiscal year. In the latter situation, the insurance company initially provides an estimated rebate factor at the beginning of the fiscal year. A look-up table shows the premium due on each day of the fiscal year versus the dollar amount of the purchases made on that particular day. The purchasing system in this embodiment includes a means for deducting the premium from the received funds to obtain net funds, segregating those net funds with respect to each vendor selling the selected goods and services, and transferring the segregated funds with the segregated orders to the respective vendors. This computer program also includes means for inputting an updated rebate factor at the end of the fiscal year provided by the insurance company and means for preparing a final report for each subscriber-purchaser. The final report shows the total future rebate or the value of the annuity contract due 20 years from the end of that fiscal year based upon the total purchase orders by that subscriber-purchaser and upon the updated rebate factor.

BRIEF DESCRIPTION OF THE DRAWINGS

Further objects and advantages of the present invention will be found in the detailed description of the invention and in the accompanying drawings in which:

FIG. 3 shows a daily report to verify the receipt of funds or money;

FIG. 4 shows a vendor/ICA information report listing the purchased merchandise, the associated vendor and various fund allocations; and FIG. 5 shows an Individual Consumer Account statement (ICA) in accordance with the present invention.

DETAILED DESCRIPTION OF THE INVENTION

The present invention relates to a computer program utilized in conjunction with a transactional system for purchasing goods and services.

The transactional system involves a plurality of subscriber-purchasers, a plurality of vendors making available goods and services, and a future benefit guarantor. Hereinafter, the future benefit guarantor will be referred to as an insurance company since the future benefit or future rebate is the sum of money paid to the consumer/purchaser 20 years from the end of the fiscal year in which the consumer makes the purchase through the transactional system. As used herein the terms "consumer," "purchaser" and "subscriber-purchaser" all refer to an individual utilizing this transactional system to purchase a selected good or service. The use of the term "subscriber" is based on the concept that the individual subscribes to this transactional system of trading or maketing goods and services.

As is known, an annuity contract is a contract between two parties, such as an individual and an insurance company, wherein the insurance company is obligated to pay either a fixed amount of money at some definite time in the future or to pay periodic amounts of money over a set period of time to the individual. The annuity contracts discussed herein represent an agreement between the insurance company and the individual such that the insurance company will pay the individual a certain amount of money 20 years in the future. The use of an annuity contract as a future rebate is not meant to limit the scope of the invention herein. Other future rebates can be utilized with this purchasing system as long as those rebates are a fixed amount and are due and payable at a certain date in the future. Further, the use of an insurance company as the future benefit guarantor herein is not meant to limit the scope of the claims since any person or entity can enter into an annuity contract requiring that person to pay a sum of money to another at a certain date in the future. The scope of the claims appended hereto is meant to encompass such guarantors.

A general description of the transactional system follows. The consumer or subscriber-purchaser, places an order for a selected good or service from a particular vendor selected by the purchasing center. For example, that order may be placed over the telephone to an individual at a purchasing center. Herein, the purchasing center is the place where the orders are processed and the various reports and the transfer of funds are verified. This purchasing center need not necessarily be a centralized operation but may be spread over several locations. In that sense, the computer program generating the reports and instructions for the flow of funds and the flow of information to the subscriber-purchaser may also be at a decentralized location. Of course, to be most efficient, the program would normally be run at a central data processing center which may or may not be at the purchasing center that acts as an input and output data processing center. The scope of this invention is not limited to a centralized nor a decentralized system.

The purchaser communicates his purchase to the individual at the purchasing center and communicates the preferred method of paying for those goods and services. The individual at the purchasing center then inputs this order into the purchasing system program. The purchaser then sends the funds, representing the cost of the goods and services, to the purchasing center. After verifying the order and the receipt of funds, in one embodiment, the purchasing center sends the funds and an instruction to pay that particular vendor selling that particular good or service to an escrow agent.

In a preferred situation, the operator of the purchasing system has negotiated with a wide variety of vendors to pay a generally wholesale price for the goods and services. Therefore, a differential exists between the price paid by the purchaser-subscriber and the wholesale price due the vendor. Vendors are motivated to join this transactional system because purchasers will be motivated to patronize their shops to the exclusion of other vendors because of the future rebate guaranteed to the purchaser by the system. With the guaranteed patronage of purchasers, the vendors have lower marketing costs for advertising, etc., and therefore can offer reduced prices to the operator of the purchasing system. In a current embodiment, the vendors are non-exclusive wholesalers of a number of goods and services, i.e., two or three vendors sell the same goods.

Returning to the general description of this embodiment, the escrow agent pays the insurance company a premium for an aggregate annuity policy and then pays the vendor the wholesale price for the selected good or service. An aggregate annuity policy is purchased on a daily basis by the escrow agent for all the purchases made by all the subscriber-purchasers input into the system that day. The escrow agent also pays the sales tax due any taxing authorities for the purchase of the selected goods or services, pays credit card transaction fees and any other miscellaneous fees such as the administrative expenses by the operator of the purchasing system. As used herein, the "purchasing system" refers to the computer program identifying and controlling the flow of orders, funds and information to the vendors, escrow agent, insurance company and the purchaser-subscribers. The term "transactional system" refers to the overall concept of purchasing goods and services and receiving a future guaranteed rebate.

At the end of each accounting quarter, the system generates a quarterly report for each subscriber-purchaser showing the total individual purchases made during the quarter and an estimated rebate due 20 years from the end of the fiscal year covering that quarter. As stated above, the rebate is payable by the insurance company to the individual subscriber-purchaser.

At the end of the fiscal year, the insurance company provides a fixed or updated rebate factor that is based, in one embodiment, on the 20-year Treasury bond rate of return. After inputting this updated rebate factor into the purchasing system, the system then generates a final accounting for each subscriber-purchaser showing the definite rebate due 20 years from the end of the fiscal year based upon the updated rebate factor from the insurance company and further based upon the total purchases by the subscriber-purchaser during that fiscal year (herein FY).

The purchasing system also generates an instruction to the insurance company to issue individual annuity contracts to each individual subscriber-purchaser. As described earlier, during the fiscal year, the insurance company provides an aggregate annuity policy for all the purchaser-subscribers and then at the end of the year converts that aggregate or group annuity policy into individual annuity policies for each subscriber-purchaser.

This transactional system motivates the subscriber-purchasers to return to the purchasing center that utilize part of the transactional system. The purchasing system embodied by the computer program described herein assists in the transfer of funds and the dissemination of information and instructions to the vendor, the insurance company as the future benefit guarantor, and each individual subscriber-purchaser.

Figure 1A:
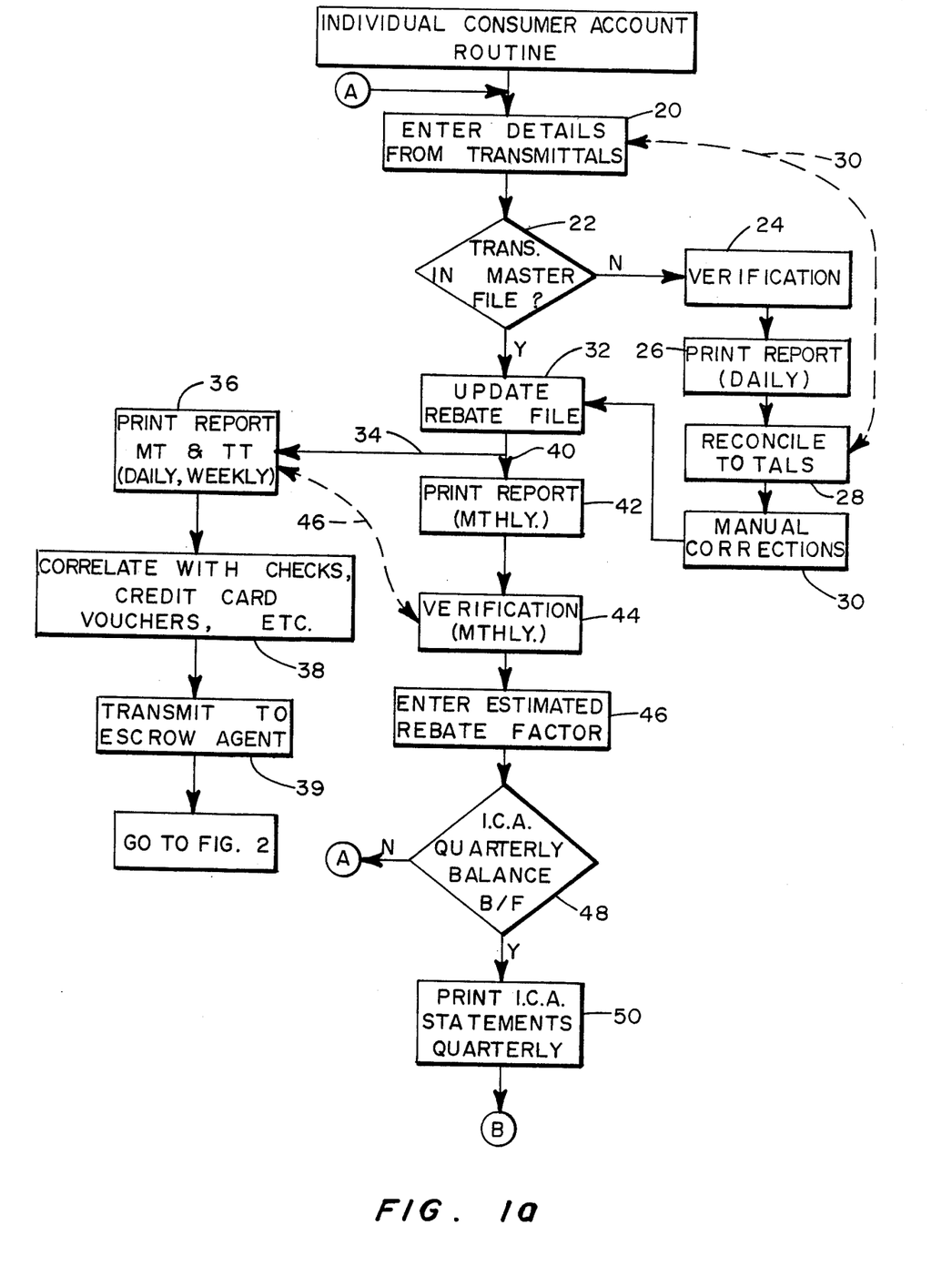
FIGS. 1a and 1b show a general flowchart of the Individual Consumer Account routine for the purchasing system in accordance with the principles of the present invention.
Figure 1B:
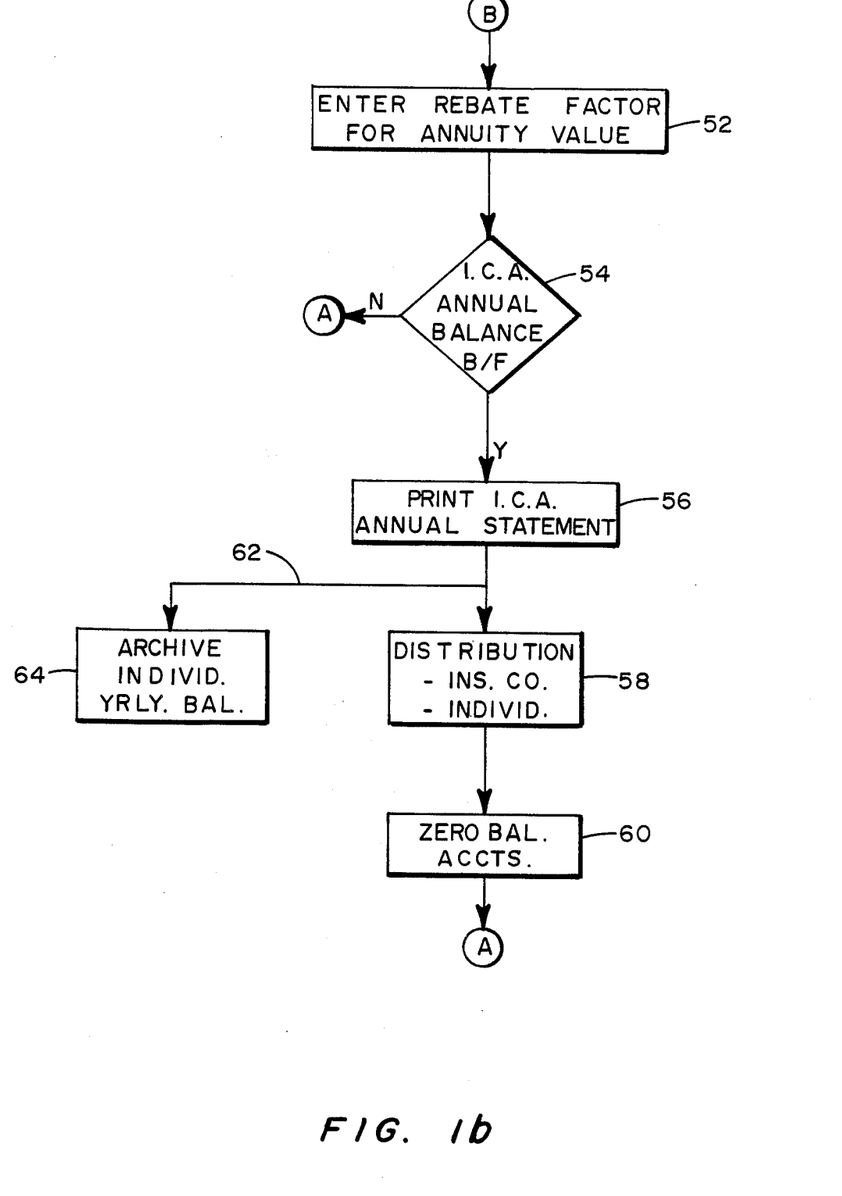
Figure 2:
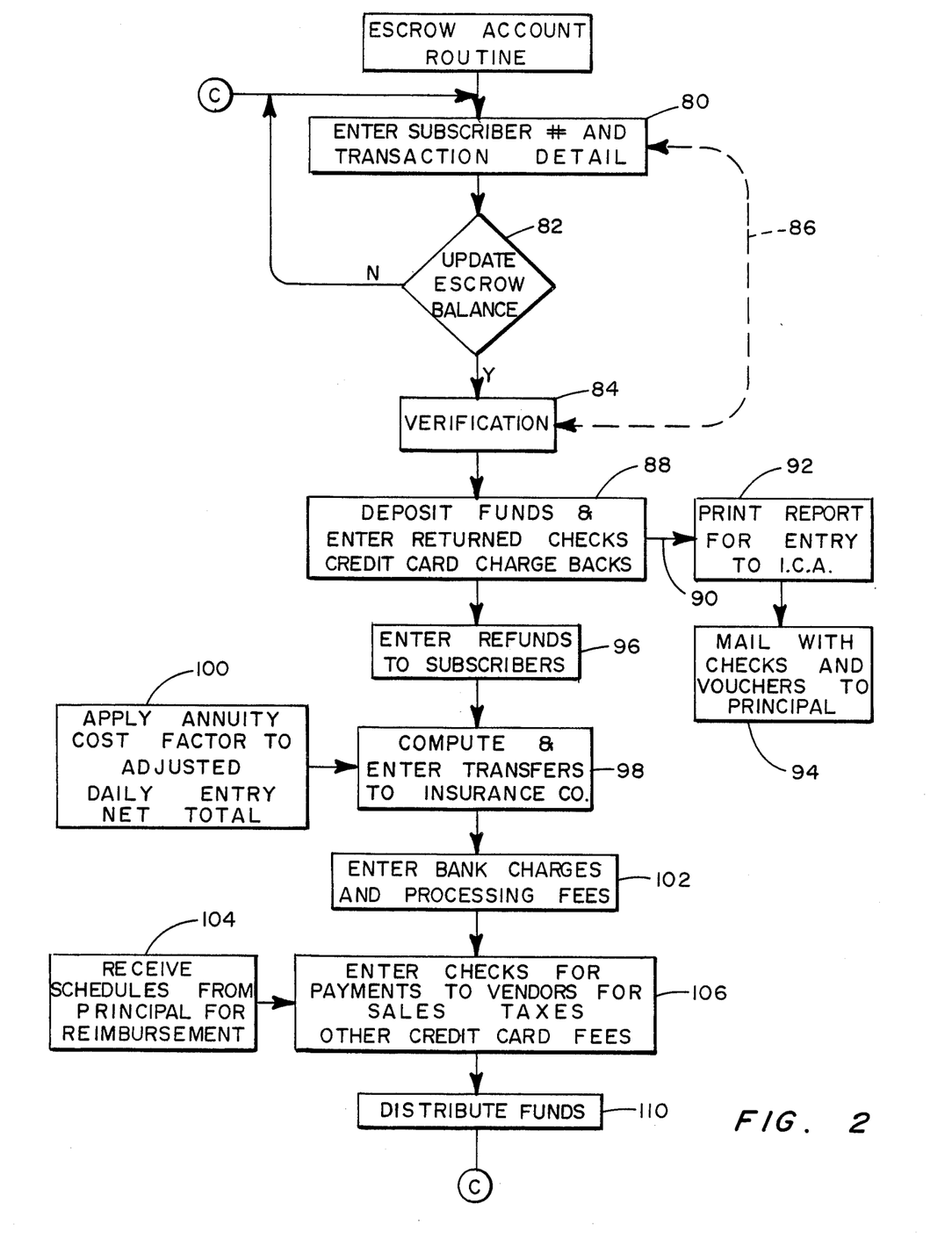
FIG. 2 illustrates a flowchart for the escrow account routine in accordance with the principles of the present invention.

A detailed description of one embodiment of the purchasing system program is found in FIGS. 1a, 1b and 2.

The Individual Consumer Account routine is shown in flowchart form in FIG. 1a. Step 20 shows that orders from a plurality of subscriber-purchasers for selected goods and services are input into the system. This is done over a short time period, preferably per day. Table I that follows shows the information on a detail report which is entered into the Individual Consumer Account (herein ICA) routine. The items in the left-hand column of Table I appear for each transaction and the items in the right-hand column of Table I represent the totals for the entire data input sheet that includes up to approximately 25 transmittals from individual subscriber-purchasers. Table II, that immediately follows, shows the breakdown for the received funds and also appears on the transmittal sheet.

TABLE I

| | |
|---|---|
| Subscriber Number | |
| Name | |
| Item Detail of | |
| Goods/Services | |
| Method of Payment | |
| Base Price | Total Base |
| Tax | Total Tax |
| Administration Fee | Total Admin |
| Total Price of Item | Grand Total |

TABLE II

| |
|---|
| Cash |
| Credit Cards |
| Airline Reporting Corp. Vouchers |
| Checks |
| Total Funds Received |

An additional piece of information associated with each transaction is the vendor supplying the goods or services. In one embodiment, all the transmittals for one vendor are input at one time since the transmittal forms are compiled in the field and then sent to the purchasing system center. Table I is not meant to be exhaustive and could be modified or expanded to include information on the particular vendor.

Decision step 22 in FIG. 1a inquires whether those particular transmittals are already in the master file. Particularly, step 22 determines whether the subscriber-purchaser is in the master file. If the decision is NO, verification routine 24 is entered. Step 26 prints a daily report that is shown in FIG. 3 and in step 28 the totals are reconciled with the input transmittal forms initially used to input data into the ICA routine in step 20. Dashed line 30 shows the relationship between these two steps. This reconciliation normally is done manually as a data input checking routine. Step 30 involves manually correcting the data base in the purchasing system program and step 32 updates the rebate file. The YES branch from decision step 22 also leads to update rebate file step 32.

The rebate file is a file in the computer system for each individual subscriber-purchaser. The file holds information on the items shown in Table III below. Table III does not represent the entire content of the rebate file.

TABLE III

| |
|---|
| Subscriber Number |
| Subscriber Name |
| Address |
| Telephone Number |
| Purchases Current Quarter |
| Purchases Previous Quarters in FY |
| Rebates Current Quarter |
| Rebates Previous Quarters |

On a daily basis, the program branches along branch 34 to step 36, the print daily MT report and report weekly TT report. A typical report generated by step 36 is shown in FIG. 4. FIG. 4 shows from left to right the transaction number, the ID number of the subscriber-purchaser, the name of the subscriber-purchaser, the type of merchandise bought by the subscriber-purchaser, where the merchandise was bought, i.e., the vendor's name, the sales taxes due for that purchase, the vendor charge or the funds due the vendor for the purchase of the goods, the administration fee (admin fee) due to the processing center for processing this transaction, the total amount paid by the subscriber-purchaser, and the ICA fund.

As stated earlier, this transactional system works on the theory that the vendor can charge less for his goods and service if he can be guaranteed repeat customers and therefore he does not have to conduct extensive advertising since those customers will continue to return because of the prospect of the customers' receiving a future rebate.

Step 38 correlates the checks, credit card vouchers and generally the funds received from all the subscriber-purchasers to the daily MT report. Step 39 transmits the report and the funds to an escrow agent. In one embodiment, an independent escrow agent is used to handle the funds from all the purchaser-subscribers. This independent escrow agent is a distinct entity as compared with the purchasing center. However, in another embodiment, the escrow agent is simply a separate department within the purchasing center which handles the funds as distinct from the data input and account payable departments of the purchasing center.

Returning to update rebate file step 32, after a certain period of time, such as a month, branch 40 is taken and step 42 involves printing a report on a monthly basis which is a further check of the data input into the system. This verification occurs in step 44 and dashed line 46 shows that the weekly TT reports are justified against the updated rebate files produced in step 32 to ensure the integrity of the data base and accounting system.

In step 46, an estimated rebate factor is input into the system. This estimated rebate factor is provided by the insurance company based upon the expected value of an annuity contract at the end of a 20-year period. The insurance company in one embodiment is instructed to purchase 20-year Treasury bonds first as a group annuity policy throughout the fiscal year and then at the end of the fiscal year to subdivide that group policy into individual policies for each subscriber-purchaser.

The purpose of using an estimated rebate factor is to motivate the subscriber-purchasers to utilize this transactional system further. In another embodiment, the estimated rebate factor is 100% and that rebate factor is adjusted appropriately at the end of the fiscal year when the insurance company provides the fixed or certain rebate factor for the 20-year annuity contracts.

Decision step 48 determines whether a three-month period or a quarter has passed and, if not, the routine jumps back, via flowchart points A, to transmittal entry step 20. If a quarter has passed, the balance for the previous quarters in the fiscal year is brought forward, the current quarter figures are added thereto, and in step 50 an Individual Consumer Account statement is printed out, reported and distributed to each subscriber-purchaser. This report is shown in FIG. 5.

As seen from the report in FIG. 5, the date of each transaction is provided, a description of the transaction, the total amount paid to the purchasing center, the net cost of the goods less taxes, an estimated rebate factor (shown as 90% in FIG. 5) and a future rebate value is shown for each purchase. The current quarterly rebate, the balance forward rebate from previous quarters and the year-to-date rebate are also reported. This information is taken directly from the rebate file associated with each subscriber-purchaser.

Following flowchart jump point B from FIG. 1a to FIG. 1b, an updated rebate factor is input into the purchasing system as shown in step 52. This updated rebate factor is provided by the insurance company at the end of the fiscal year which in one embodiment is March 31. The insurance company at that time can provide a definitive value of the annuity contracts and hence the program can compute the individual annuity contract rebate values for each subscriber-purchaser based upon that purchaser's total purchases versus all the purchases made through the transactional system (i.e., the percentage of individual to the total goods and services bought by all purchasers).

Decision step 54 determines whether the end of the fiscal year has occurred and if not the program jumps, via jump point A, to step 20 in FIG. 1a. If the fiscal year has ended, step 56 prints the ICA annual statement for each Individual Consumer Account. A portion of this ICA statement is distributed to the insurance company as noted in step 58 in order to instruct the insurance company to prepare an individual annuity contract for that respective subscriber-purchaser. Of course, each individual subscriber-purchaser receives the annual ICA statement. Step 60 zero balances the accounting system and the system returns to jump point A immediately preceding the enter transmittals step 20 in FIG. 1a. A branch 62 occurs after printing step 56 which archives the individual subscriber-purchaser's yearly balance into some memory in step 64.

FIG. 2 shows the escrow account routine for handling the transfer of funds. Step 80 involves entering the subscriber number and the transaction detail. This step occurs in one embodiment of the present invention when the escrow agent is a distinct entity as compared simply with a department within the purchasing center. In another embodiment, when the escrow agent is not a distinct entity, i.e., when the vendors are paid directly by the purchasing center, step 80 is not necessary since the program already has this information in its files. Decision step 82 determines whether the transaction has already been entered and whether to update the escrow balance. If the transaction has not been entered, verification step 84 is conducted which, as shown by dashed lines 86, compares the data entered on the computer with the transaction details supplied to the escrow agent in step 80.

Step 82 deposits the funds transmitted to the escrow agent and enters return checks and credit card charge backs if checks are returned for any reason or if the subscriber-purchasers require credit card charge backs. Branch 90 extends to step 92 which prints the report for the ICA to adjust the ICA accounts and the rebate files described with respect to FIGS. 1a and 1b. Step 94 is provided for transmitting the returned checks and charge back vouchers from the escrow agent to the purchasing center labeled as "Principal" in step 94. Step 96 enters the refunds to the subscriber-purchasers due to the returned checks or credit card charge backs in step 88.

Step 98 computes the premium due the insurance company for the aggregate annuity policy and further enters the transfers to that insurance company. Input step 100 involves inputting the rebate factor or the amount of the premium into the program. Table IV below shows that the premium due varies based upon a given aggregate ICA fund value and based upon the particular day within the fiscal year. Table IV assumes the insurance company has estimated the cost of the 20-year Treasury bonds accurately and has set that premium charge for the entire year. Table IV is only illustrative of how a premium may be calculated by the operation of a look-up table in the program. The premiums shown herein are not accurate.

TABLE IV

| Daily Aggregate ICA Fund $ | Day$_1$ | Day$_2$ | Day$_3$ | ... | Day$_{364}$ |
|---|---|---|---|---|---|
| 0 | 0 | 0 | 0 | | 0 |
| 100 | 5.00 | 5.20 | 5.40 | | 10 |
| 200 | 10.00 | 10.40 | 10.80 | | 20 |
| . | | | | | |
| . | | | | | |
| 10,000 | 500.00 | 502.00 | 503.00 | | 1000.00 |
| 10,100 | 505.00 | — | — | | 1010.00 |
| 10,200 | 510.00 | — | — | | 1020.00 |

Of course, the insurance company may adjust the premium, and hence adjust the rebate factor, more often than once a year, for example, each quarter or each month, depending on the volatility of 20-year Treasury bonds.

Step 102 enters the bank charges and processing fees required to handle all the funds sent to the escrow agent by the relatively great number of subscriber-purchasers. Input step 104 calls for the input of schedules showing the disbursements of funds to vendors and the reimbursement of the administration fee back to the principal for the processing center. Step 106 prints the checks or enters the checks for payment to the vendors, to the taxing authorities, to the credit card companies and to any other entities charging miscellaneous costs against the system. Step 110 shows the actual distribution of these funds and flowchart jump point C returns the program to enter transaction detail step 80 in FIG. 2. In one working embodiment, the vendors are paid directly by the purchasing center and, upon proper notification, the escrow agent reimburses the purchasing center for these vendor payments.

The claims appended hereto are meant to encompass all alternatives and modifications within the scope and spirit of the present invention.

What is claimed is:

1. In combination with a transactional system utilized by a plurality of subscriber-purchasers, an agent, vendors, and a future benefit guarantor, a system for purchasing goods and services from said vendors and obtaining future guaranteed rebates based in part upon a rebate factor periodically calculated by said future benefit guarantor comprising:

means for inputting purchase orders from a plurality of subscriber-purchasers for selected goods and services that are available from said vendors, said orders originating from said plurality of subscriber-purchasers over a short time period;

means, coupled to the order input means, for correlating a transfer of funds with said orders for said selected goods and services, said funds representing the cost to said subscriber-purchasers of said selected goods and services and said transfer occurring between said subscriber-purchasers and said agent;

means for inputting said rebate factor on a periodic basis;

means, coupled to the correlation means and the factor input means, for computing and reporting a rebate, due in the future, to each individual subscriber-purchaser at a predetermined future date from said future benefit guarantor to each said subscriber-purchaser based upon the cost of the individually selected good and service and said rebate factor; and,     means, coupled to said correlation means, for providing instructions to pay:

said vendors for said plurality of selected goods and services;

said future rebate guarantor a premium representing said purchase price of said future guaranteed rebates that the future benefit guarantor will be required to make to said plurality of purchaser-subscribers on said predetermined future date.

2. A combination as claimed in claim 1 further comprising:

means for accumulating, on an individual basis, the total purchase orders for each individual purchaser-subscriber and the total rebates over an accounting time period that comprises a plurality of said short time periods;

means, coupled to the accumulating means, for further instructing said future benefit guarantor to issue individual future guaranteed rebate contracts to each said purchaser-subscriber based upon said total rebate accumulated over said accounting time period at the end of said accounting time period;

wherein said instruction to pay said premium for said future guaranteed rebates is for an aggregate rebate for all said purchaser-subscribers over said accounting time period.

3. A combination as claimed in claim 2 wherein said short time period is a daily time period, said accounting time period is a yearly time period, and said rebate factor is calculated by said future benefit guarantor on a yearly basis.

4. In combination with a transactional system utilized by a plurality of subscriber-purchasers, vendors, and a future benefit guarantor, a system for purchasing goods and services from said vendors and obtaining future guaranteed rebates based in part upon a rebate factor periodically calculated by said future benefit guarantor comprising:

means for inputting purchase orders from a plurality of subscriber-purchasers for selected goods and services that are available from said vendors, said orders originating from said plurality of subscriber-purchasers over a short time period;

means, coupled to the order input means, for correlating a receipt of funds with said orders for said selected goods and services, said funds representing the cost to said subscriber-purchasers of said selected goods and services;

means for inputting said rebate factor on a periodic basis;

means, coupled to the correlation means and the factor input means, for calculating a premium for a future guaranteed rebate based upon the totality of funds received during said short time period, said rebate factor and the number of days to the end of an accounting period, said accounting period comprising a plurality of said short time periods;

means, coupled to said correlation means and the calculating means, for instructing and reporting the payment of said premium to said future rebate guarantor representing a purchase price of said future guaranteed rebates that the future benefit guarantor will be required to make to said plurality of purchaser-subscribers at a predetermined date in the future;

means, coupled to said calculating means, for deducting at least said premium from said funds to obtain net funds and for segregating said net funds and said orders with respect to each vendor selling said selected goods and services and for transferring said segregated funds with the segregated orders to the respective vendors;

means, coupled to the correlation means and the factor input means, for computing and reporting an estimated rebate, due at said predetermined future date to each individual subscriber-purchaser from said future benefit guarantor, based upon the cost of the individually selected good and service and said rebate factor;

means for accumulating, on an individual basis, the total purchase orders for each individual purchaser-subscriber over said accounting period;

means, coupled to the accumulating means, for further instructing said future benefit guarantor to issue individual future guaranteed rebate contracts to each said purchaser-subscriber based upon said total purchase orders accumulated over said accounting period at the end of said accounting period;

means for inputting an updated rebate factor from said future benefit guarantor at the end of said accounting period;

means for preparing a final report for each said subscriber-purchaser at the end of said accounting period showing a total future rebate due at said predetermined future date based upon said total purchase orders and said updated rebate factor.

5. In combination with a transactional system utilized by a plurality of subscriber-purchasers, vendors, and a future benefit guarantor, a system for purchasing goods and services from said vendors and obtaining future guaranteed rebates based in part upon a rebate factor periodically calculated by said future benefit guarantor comprising:

means for inputting purchase orders from a plurality of subscriber-purchasers for selected goods and services that are available from said vendors, said orders originating from said plurality of subscriber-purchasers over a short time period;

means, coupled to the order input means, for correlating a transfer of funds with said orders for said selected goods and services, said funds representing the cost to said subscriber-purchasers of said selected goods and services;

means for inputting said rebate factor on a periodic basis;

means, coupled to the correlation means and the factor input means, for computing and reporting a rebate, due in the future, to each individual subscriber-purchaser at a predetermined future date from said future benefit guarantor to each said subscriber-purchaser based upon the cost of the individually selected good and service and said rebate factor; and, means, coupled to said correlation means, for providing information relating to the payment to:

said vendors for said plurality of selected goods and services;

said future rebate guarantor for a premium representing said purchase price of siad future guaranteed rebates that the future benefit guarantor will be required to make to predetermined future date.

6. In combination with a transactional system utilized by a plurality of subscriber-purchasers, vendors, and a future benefit guarantor, a system for purchasing goods and services from said vendors and obtaining future guaranteed rebates based in part upon a rebate factor periodically calculated by said future benefit guarantor comprising:

means for inputting purchase orders from a plurality of subscriber-purchasers for selected goods and services that are available from said vendors, said orders originating from said plurality of subscriber-purchasers over a short time period;

means, coupled to the order input means, for correlating a receipt of funds with said orders for said selected goods and services, said funds representing the cost to said subscriber-purchasers of said selected goods and services;

means for inputting said rebate factor on a periodic basis;

means, coupled to the correlation means and the factor input means, for calculating a premium for a future guaranteed rebate based upon the totality of funds received during said short time period, said rebate factor and the number of days to the end of an accounting period, said accounting period comprising a plurality of said short time periods;

means, coupled to said correlation means and the calculating means, for reporting said premium due said future rebate guarantor representing a purchase price of said future guaranteed rebates that the future benefit guarantor will be required to make to said plurality of purchaser-subscribers at a predetermined date in the future;

means, coupled to said calculating means, for deducting at least said premium from said funds to report net funds and for segregating said net funds and said orders with respect to each vendor selling said selected goods and services and for reporting the segregated funds due each respective vendor;

means, coupled to the correlation means and the factor input means, for computing and reporting an estimated rebate, due at said predetermined future date to each individual subscriber-purchaser from said future benefit guarantor, based upon the cost of the individually selected good and service and said rebate factor;

means for accumulating, on an individual basis, the total purchase orders for eahc individual purchaser-subscriber over said accounting period;

means, coupled to the accumulating means, for further reporting the individual future guaranteed rebate contracts due each said purchaser-subscriber based upon said total purchase orders accumulated over said accounting period at the end of said accounting period;

means for inputting an update rebate factor from said future benefit guarantor at the end of said accounting period;

means for preparing a final report for each said subscriber-purchaser at the end of said accounting period showing a total future rebate due at said predetermined future date based upon said total purchase orders and said updated rebate factor.

* * * * *